(12) United States Patent
Hod et al.

(10) Patent No.: US 11,086,389 B2
(45) Date of Patent: Aug. 10, 2021

(54) METHOD AND SYSTEM FOR VISUALIZING SLEEP MODE INNER STATE PROCESSING

(71) Applicant: Western Digital Technologies, Inc., San Jose, CA (US)

(72) Inventors: Liat Hod, Kfar Saba (IL); Tai Shaked, Hana-Karkur (IL); Eyal Sobol, Givat Shmuel (IL); Omer Gilad, Holon (IL); Uma Gaddale, Raichur (IN)

(73) Assignee: Western Digital Technologies, Inc., San Jose, CA (US)

( * ) Notice: Subject to any disclaimer, the term of this patent is extended or adjusted under 35 U.S.C. 154(b) by 15 days.

(21) Appl. No.: 16/667,565

(22) Filed: Oct. 29, 2019

(65) Prior Publication Data

US 2021/0124410 A1    Apr. 29, 2021

(51) Int. Cl.
| | | |
|---|---|---|
| *G06F 1/3296* | (2019.01) | |
| *G06F 1/3287* | (2019.01) | |
| *G06F 16/901* | (2019.01) | |
| *G06F 9/4401* | (2018.01) | |
| *G06F 1/3206* | (2019.01) | |

(52) U.S. Cl.
CPC .......... *G06F 1/3296* (2013.01); *G06F 1/3206* (2013.01); *G06F 1/3287* (2013.01); *G06F 9/4418* (2013.01); *G06F 16/9024* (2019.01)

(58) Field of Classification Search
CPC ..... Y02D 10/00; G06F 1/3203; G06F 1/3293; G06F 1/3212; G06F 1/3234; G06F 1/324; G06F 1/3243; G06F 1/329
USPC .................. 455/574; 713/320, 323, 300, 322
See application file for complete search history.

(56) References Cited

U.S. PATENT DOCUMENTS

| | | | |
|---|---|---|---|
| 10,264,097 B2 | 4/2019 | Shaked et al. | |
| 10,296,260 B2 | 5/2019 | Duzly et al. | |
| 2002/0054222 A1* | 5/2002 | Nitta .................. | H04N 1/00127 348/231.6 |
| 2004/0103331 A1* | 5/2004 | Cooper ................. | G06F 9/4418 713/323 |
| 2010/0031075 A1 | 2/2010 | Kapil | |
| 2010/0142276 A1* | 6/2010 | Kasuga ................. | G11C 16/26 365/185.11 |
| 2010/0189416 A1* | 7/2010 | Kawakami .......... | G11B 19/047 386/241 |
| 2013/0042127 A1 | 2/2013 | Thomas et al. | |
| 2013/0346480 A1* | 12/2013 | Certain ................ | G06F 15/167 709/203 |
| 2014/0201552 A1 | 7/2014 | Bold et al. | |
| 2015/0215245 A1 | 7/2015 | Carlson et al. | |

(Continued)

OTHER PUBLICATIONS

International Search Report dated Jul. 27, 2020 for International Application No. PCT/US2020/024409.

(Continued)

*Primary Examiner* — Faisal M Zaman
(74) *Attorney, Agent, or Firm* — Brinks Gilson & Lione

(57) ABSTRACT

A method and system for visualizing sleep mode inner state processing are provided. In one embodiment, a method is provided that is performed in a computing device in communication with a storage system comprising a memory. The method comprises receiving information from the storage system concerning a number and duration of tasks performed by the storage system to exit a sleep mode; and displaying a visualization of the information. Other embodiments are provided.

20 Claims, 8 Drawing Sheets

(56) References Cited

U.S. PATENT DOCUMENTS

| | | |
|---|---|---|
| 2015/0262556 A1 | 9/2015 | Edwall et al. |
| 2015/0268872 A1 | 9/2015 | Ding et al. |
| 2017/0131948 A1 | 5/2017 | Hoang et al. |
| 2017/0185139 A1 | 6/2017 | Zwerg et al. |
| 2018/0246674 A1* | 8/2018 | Kim ............... G06F 3/0635 |
| 2019/0108117 A1 | 4/2019 | O'Dowd et al. |
| 2019/0324899 A1* | 10/2019 | Kulkarni ............ G06F 3/0616 |
| 2020/0066362 A1* | 2/2020 | Zhu ............ G11C 11/40626 |

OTHER PUBLICATIONS

Written Opinion dated Jul. 27, 2020 for International Application No. PCT/US2020/024409.

U.S. Appl. No. 16/371,613 entitled "Method and System for Visualizing a Correlation Between Host Commands and Storage System Performance" filed Apr. 1, 2019, Tal Shaked et al.

\* cited by examiner

METHOD AND SYSTEM FOR VISUALIZING SLEEP MODE INNER STATE PROCESSING

BACKGROUND

In some environments, a host can send a command to a storage system to cause it to go in to a sleep, or low-power, mode. By being in a low-power mode, the storage system consumes less power, which can be advantageous to the host, especially when the host is a battery-powered device, such as a mobile phone, tablet, computer, or wearable device. When the host wants to read or write to the storage system, the host sends a command to the storage system to cause it to "wake up" and exit the low-power mode.

DETAILED DESCRIPTION

Overview

Figure 1A:
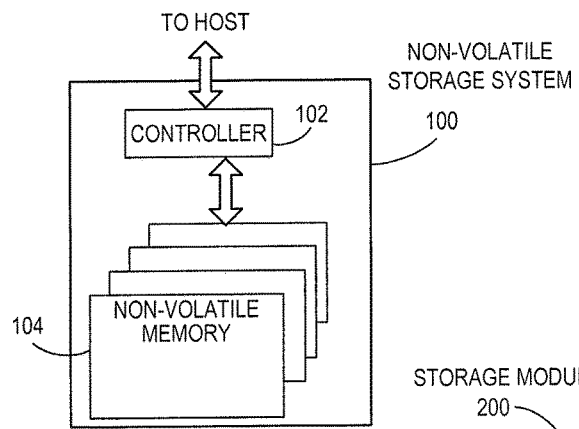
FIG. 1A is a block diagram of a non-volatile storage system of an embodiment.

By way of introduction, the below embodiments relate to a method and system for visualizing sleep mode inner state processing. In one embodiment, a method is provided that is performed in a computing device in communication with a storage system comprising a memory. The method comprises receiving information from the storage system concerning a number and duration of tasks performed by the storage system to exit a sleep mode; and displaying a visualization of the information.

In some embodiments, the information is received from the storage system via a trace file.

In some embodiments, the tasks relate to one or more of the following: exiting link hibernation, restoring power, activating a core, establishing communication with the memory, and restoring a management table.

In some embodiments, the method further comprises receiving information concerning a number and duration of tasks performed by the storage system to execute a command from the host received after a command to exit sleep mode and displaying a visualization of that information.

In some embodiments, the visualization comprises a graph.

In some embodiments, the memory comprises a three-dimensional memory.

In some embodiments, the storage system is configured to be embedded in a host.

In some embodiments, the storage system is configured to be removably connected to a host.

In another embodiment, a computing device is provided comprising an interface configured to communicate with a storage system comprising a memory and a processor. The processor is configured to receive a log file from the storage system, wherein the log file comprises data regarding operations performed by the storage system to exit a low-power mode; and generate a display of the data in a graphical form.

In some embodiments, the operations relate to one or more of the following: exiting link hibernation, restoring power, activating a core, establishing communication with the memory, and restoring a management table.

In some embodiments, the processor is further configured to display, in the graphical form, data regarding operations performed by the storage system to execute a command received from the host after a command to exit low-power mode.

In some embodiments, the graphical form comprises a graph.

In some embodiments, the memory comprises a three-dimensional memory.

In some embodiments, the storage system is configured to be embedded in a host.

In some embodiments, the storage system is configured to be removably connected to a host.

In another embodiment, a computing device is provided comprising: an interface configured to communicate with a storage system comprising a memory; means for receiving a trace file from the storage system; means for analyzing the trace file to determine a number of tasks performed by the storage system to exit sleep mode and a duration of the tasks; and means for displaying a graph of the number and duration of the tasks performed by the storage system to exit sleep mode.

In some embodiments, the tasks relate to one or more of the following: exiting link hibernation, restoring power, activating a core, establishing communication with the memory, and restoring a management table.

In some embodiments, the computing device further comprises means for displaying information about tasks performed by the storage system to perform an operation received by the storage system after a command to exit sleep mode.

In some embodiments, the memory comprises a three-dimensional memory.

In some embodiments, the storage system is configured to be embedded in a host.

Other embodiments are possible, and each of the embodiments can be used alone or together in combination. Accordingly, various embodiments will now be described with reference to the attached drawings.

EMBODIMENTS

Figure 1B:
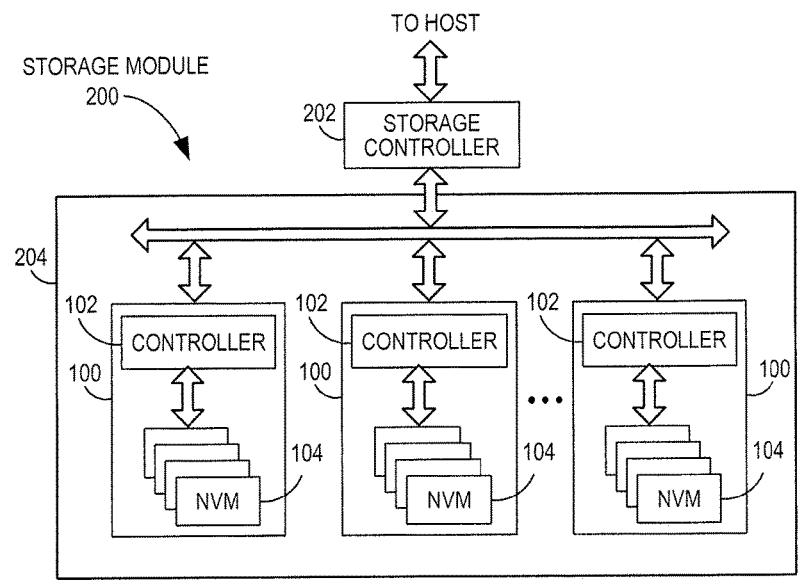
FIG. 1B is a block diagram illustrating a storage module of an embodiment.
Figure 1C:
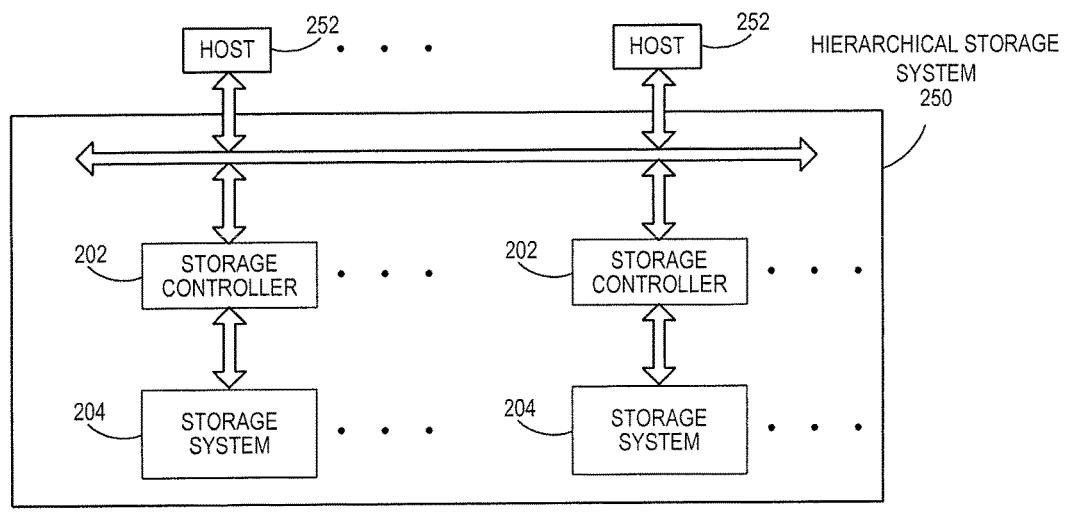
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
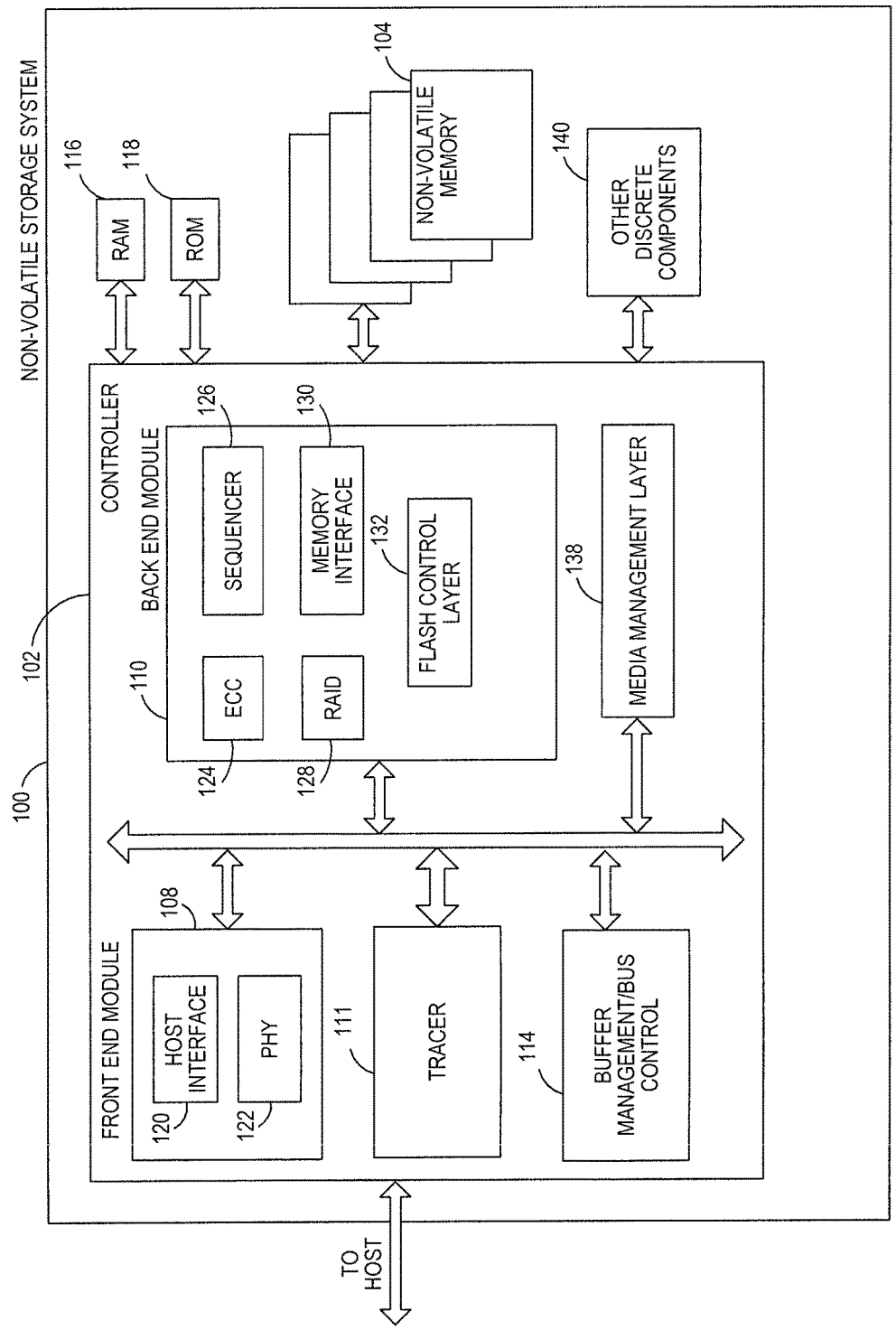
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a tracer 111, which is discussed in more detail below, and can be implemented in hardware or software/firmware.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
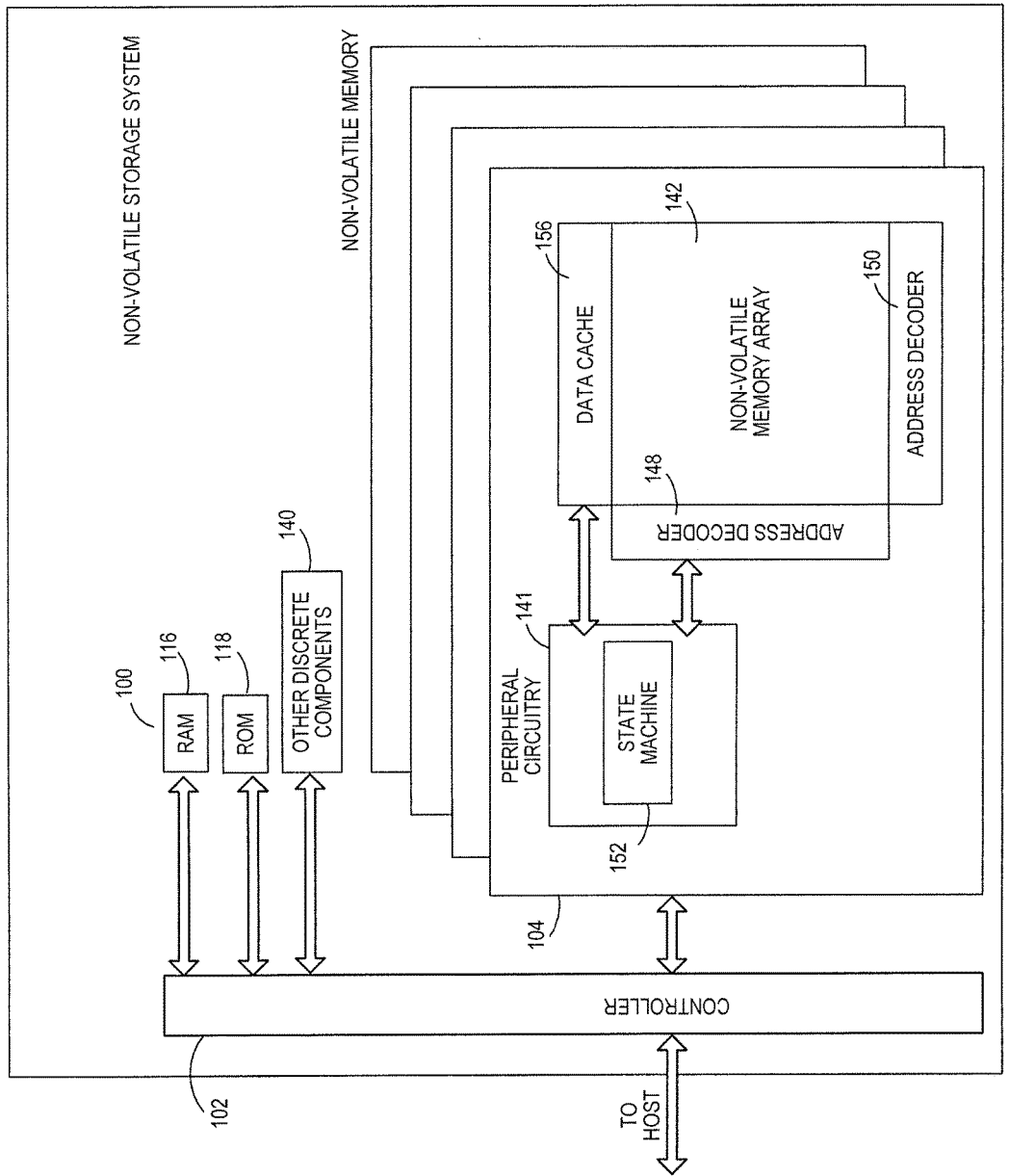
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Various components in the storage system 100 (sometimes referred to herein as the "storage device" or "device") require power, and it is sometimes desired to reduce or eliminate power to some or all of these components. For example, when the storage system 100 is used as embedded or removable memory in a battery-powered host (e.g., a portable, handheld device, such as a mobile phone or tablet), the host may want to reduce power to the storage system 100, such as when the host is not being used or does not expect to send commands to the storage system 100 for a period of time. In such situations, the host can send a command to the storage system 100 to enter "sleep mode."

As used herein, "sleep mode" refers to a mode of operation of the storage system 100 that requires less power than its regular mode of operation. The storage system 100 is still "on" in the sense that it does not require a complete reboot, as when the storage system 100 is completely powered down. However, there can be various levels of sleep modes that are associated with various levels of power reduction of the storage system 100. For example, in one type of sleep mode, power can be maintained in RAM 116 to retain data while reducing or eliminating power to other components. In another type of sleep mode, power can be eliminates from RAM 116 after flushing its contents to non-volatile memory 104. Other types of sleep modes can be used. Various types of sleep modes may be referred to by a variety of names, including stand by, suspend, hibernate, hybrid sleep, auto sleep, self-sleep, etc. For simplicity, the phrase "sleep mode" is used herein to refer to a low-power mode of the storage system 100 and does not imply a specific type of low-power mode. The following paragraphs will illustrate one example of a sleep mode, but the claims should not be limited by this example.

Figure 3:
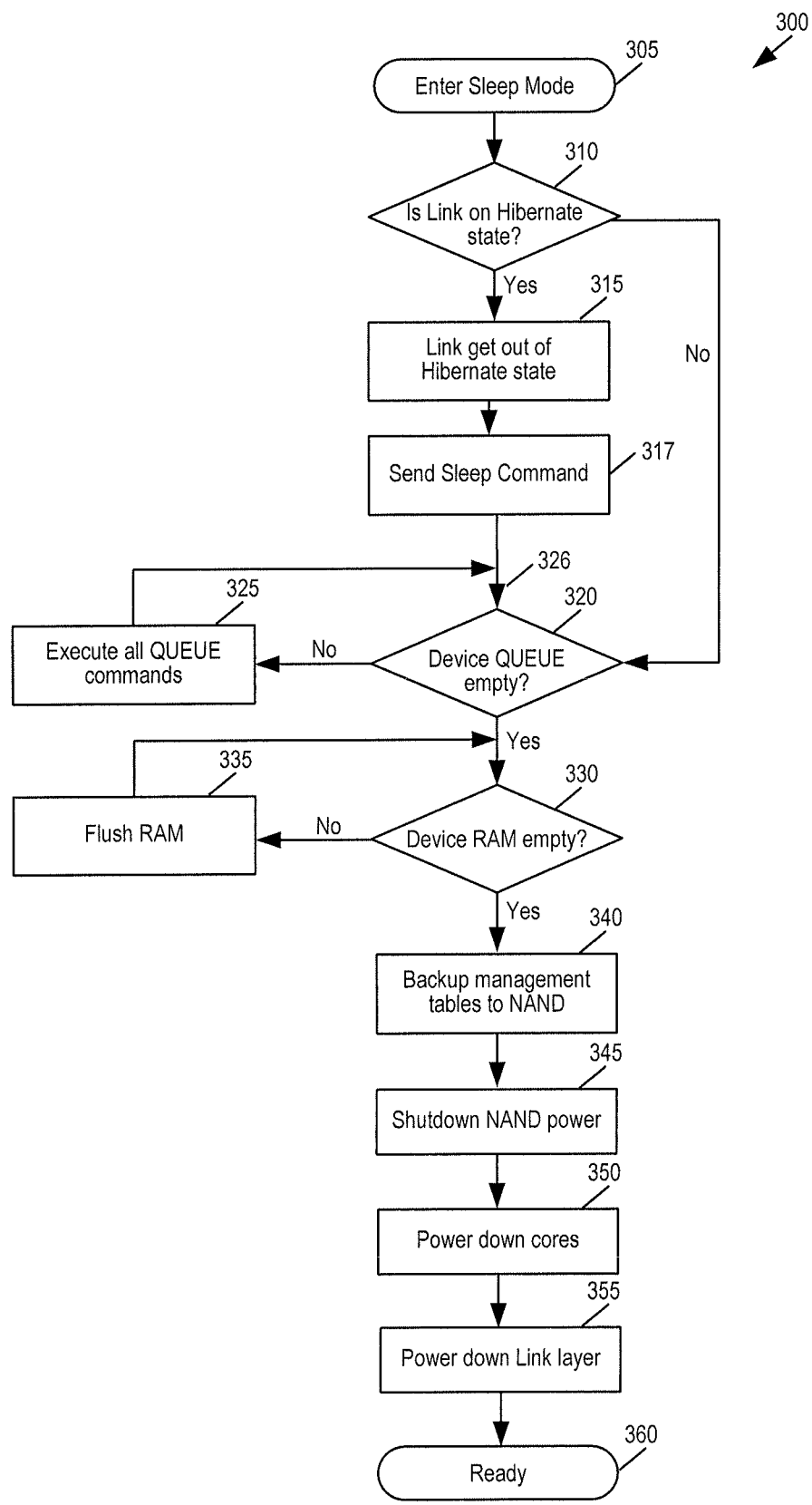
FIG. 3 is a flow chart of a method of an embodiment for entering sleep mode.

Returning to the drawings, FIG. 3 is a flow chart 300 of a method of entering sleep mode of an embodiment. In this example, the host determines, for whatever reason, that the storage system 100 should enter sleep mode (act 305). Before the host sends the command to the storage system 100 to enter sleep mode, the host first checks to see if the link between the host and the storage system 100 is in a hibernate state (act 310). The link (or link layer) is the lowest layer of the bus that physically passes commands from the host to the storage system 100. The host may put the link in the hibernate state to conserve power even if the storage system 100 is otherwise awake (e.g., to be able to react quickly from a command received from the host). If the link is in the hibernate state, the host gets the link out of the hibernate state by sending a command (e.g., a squelch command) to the storage system 100 (act 315). This allows the storage system 100 to be able to receive the sleep command from the host.

After the host gets the link out of the hibernate state or if the link was not in the hibernate state in the first place, the host sends the "enter sleep command" to the storage system 100 (act 317). The controller 102 of the storage system 100 then determines whether the storage system's queue is empty (act 320). For example, the storage system 100 may have a queue that stores commands previously-received from the host. If the queue is not empty, the controller 102 executes all queue commands to empty the queue (act 325). When the controller 102 determines the queue to be empty, the controller 102 then determines if the RAM 116 is empty (act 330). If the RAM 116 is not empty, the controller 102 flushes the RAM 116 (i.e., moves the content of the RAM 116 to non-volatile memory 104) (act 335).

When the controller 102 determines that the RAM 116 is empty, the controller 102 backs up management tables to non-volatile memory 104 (act 340). Management tables can include, for example, a logical-to-physical address mapping table, bad block information, and file system information. If these tables are stored in volatile memory, it may be desired to move them to non-volatile memory 104, so the tables are not lost (and need to later be recreated) when power is removed from the volatile memory.

With all the data and tables backed up to the non-volatile memory 104, the controller 102 shuts down power to the non-volatile memory 104. Next, the controller 102 shuts down power to various ones of its cores, while still maintaining some power to the portion of the controller 102 that is responsible for later waking up the storage system 100 (act 350). (In some embodiments where the storage system 100 is embedded in the host, the host is the only entity who can shut down the power. In some embodiments where the storage system 100 is removably connected to the host, the storage system's controller 102 can also shut down the power.) Finally, the link layer is powered down (e.g., put in hibernate mode) (act 355). With all of this complete, the storage system 100 is in sleep mode but ready to be woken up with the appropriate command from the host (act 360).

Figure 4:
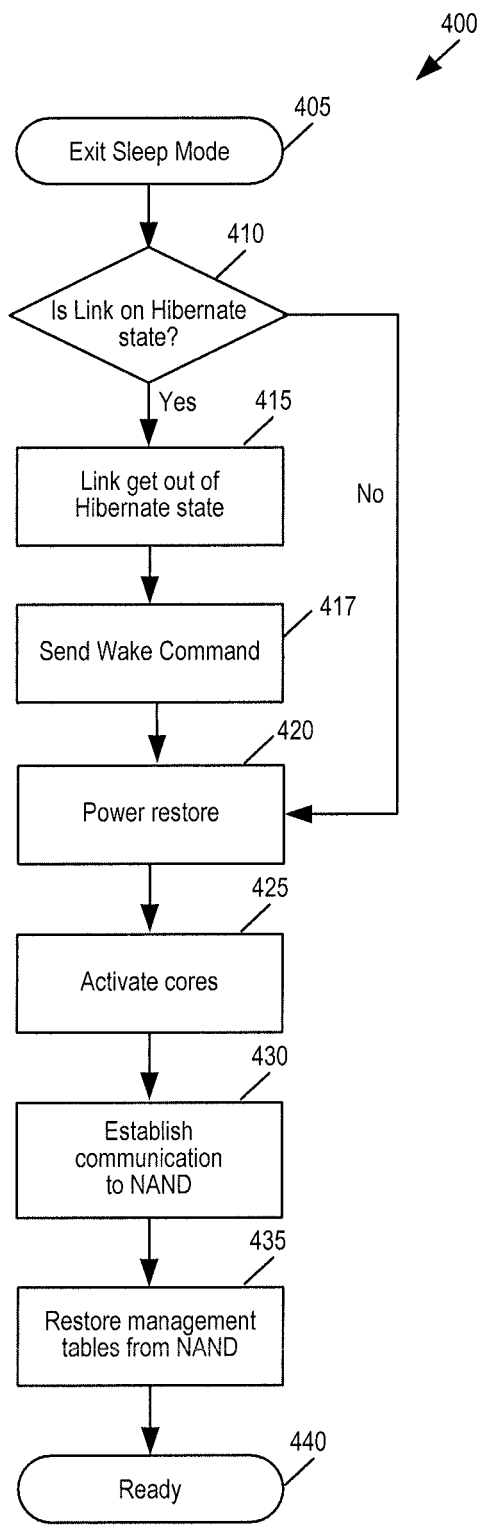
FIG. 4 is a flow chart of a method of an embodiment for exiting sleep mode.

Turning now to the flow chart 400 in FIG. 4, when the host determines that the storage system 100 should exit sleep mode (act 405), the host first determines if the link is in the hibernate state (act 410). As the storage system 100 is in sleep mode, it is likely that the link would be in the hibernate state. So, the host sends a command (e.g., a squelch command) to get the link out of the hibernate state (act 415), so the host can send an "exit sleep mode" (wake) command to the storage system 100 (act 417). After the storage system 100 receives the wake command, the controller 102 "reverses" the acts it took to put the storage system 100 in sleep mode. So, the controller 102 restores power and activates the cores it put to sleep, establishes communication to the non-volatile memory 104, and restores management tables from the non-volatile memory (acts 420, 425, 430, and 435). With this, the storage system 100 is woken up and ready to later be put back to sleep by receiving another sleep command from the host (act 440).

The various stages in FIG. 4 that the storage system 100 goes through to wake up take some time. So, after the host issues the wake command, it will need to wait some amount of time before the storage system 100 is ready to receive new commands from the host. It is desirable for the storage system 100 to wake up as quickly as possible, so the host (and possibly the end user) does not have to wait too long. To help expedite the wake up process, an engineer may be able to modify how the storage system 100 executes one or more of these wake-up stages. However, information about these stages (sometimes referred to herein as states) is not readily apparent outside of the storage system 100. Accordingly, these stages/states are sometimes referred to herein as "inner" or "hidden" stages/states. To address this issue, the following embodiments provide a method and system for visualizing sleep mode inner state processing. Visualizing these hidden states can facilitate testing and improve the exit from sleep mode quantitatively.

Figure 5:
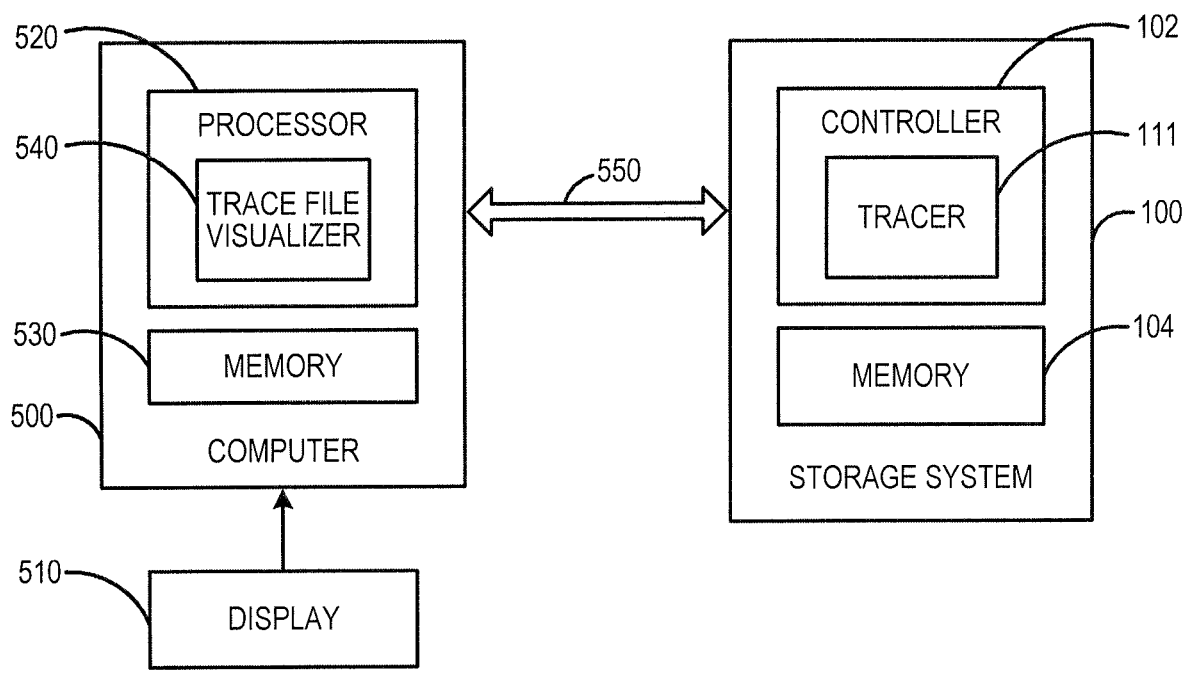
FIG. 5 is a block diagram of a system of an embodiment for visualizing sleep mode inner state processing.

Turning again to the drawings, FIG. 5 is a block diagram of a system of an embodiment for visualizing sleep mode inner state processing. As shown in FIG. 5, in this embodiment, the system comprises the storage system 100 and a computer 500 with a display 510. The storage system 100 and the computer 500 (e.g., a personal computer (PC)) can be in communication via a wired or wireless connection 550.

As mentioned above, the storage system 100 comprises a tracer 111, which can be, for example, computer-readable program code executed by the controller 102 (although other implementation can be used). The tracer 111 is used to monitor and record various memory and system operations (e.g., read, write, init, flush, discard, etc.) over a time period. The tracer 11 can also log various characteristics (parameters), such as, but not limited to, timestamps on initiation and completion, peripheral data (e.g., power state and aggregate queue depth), address in memory space, and size of command. The tracer 111 can record its tracked data in a log (e.g., in an in-memory cyclic buffer), which is sometimes referred to herein as a trace file. In one embodiment, a development platform with root access to the kernel of the controller 102 can be used to insert the tracer software/firmware 111. Being in the kernel space, the tracer 111 can have access to the controller's driver. As will be discussed below, using a trace file to report internal states (e.g., sleep modes, shutdown, and thermal events) and state transitions of the storage system 100 to the host via monitoring host commands triggers for exit from sleep/low-power modes can allow analyzing and correlating the processing time with thermal events (throttling, shutdown), link, and input-output activity and generally, to visualize event triggers and internal states versus time.

The computer 500 (also referred to herein as a computing device) and display 510 can take any suitable form. For example, the computer 500 can be a personal computer or server, and the display 510 can be a stand-alone monitor. Alternatively, the computer 500 can be a mobile device that has the display 510 integrated in it (e.g., as a touch screen). Of course, these are merely examples, and other implementations can be used.

The computer 500 in this embodiment comprises a processor 520 and a memory 530. The processor 520 is configured to implement a trace file visualizer 540. In one embodiment, computer-readable program code of the trace file visualizer 540 is stored in the memory 530 and is executed by the processor 520 (i.e., the trace file visualizer 540 can be software/firmware executed by hardware). In another embodiment, the trace file visualizer 540 is implemented exclusively in hardware. In any event, in one embodiment, the trace file visualizer 540 can be used to implement the algorithms shown in the attached flowcharts and described herein.

Figure 6:
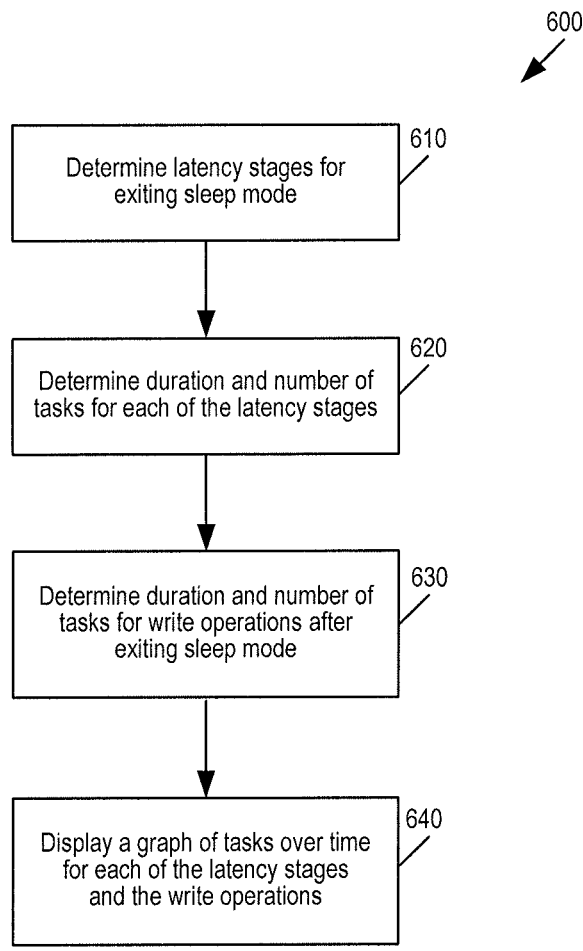
FIG. 6 is a flow chart of a method of an embodiment for visualizing sleep mode inner state processing.

In operation, when the storage system 100 receives a command from the host to exit sleep mode, the tracer 111 in the storage system 100 creates a log/trace file of the various actions the storage system 100 is taking and when it is taking those actions. At a later time, the trace file is sent from the storage system 100 to the computer 500, and the trace file visualizer 540 analyzes the trace file and produces a visualization of the data. (The computer 500 can get the trace file from the storage system 100 or the host, and information about the inner stages of sleep mode can come from traces originated at the device level.) For example, as shown in the flow chart 600 in FIG. 6, the trace file visualizer 540 can analyze the trace file to determine the latency stages for exiting sleep mode (act 610). In the above example, these stages include exiting link hibernation, power restore, activate cores, and establish memory communication, and restore management tables. Using the data in the trace file, the trace file visualizer 540 then determines the duration and number of each task of the latency stages (act 620). Next, the trace file visualizer 540 determines the duration and number of tasks for write operations that the storage system 100 executed after exiting sleep mode (act 630).

Finally, the trace file visualizer 540 displays a graph of tasks over time for each of the latency stages and write operations (act 640). Such a graph can be useful in illustrating the stages the storage system 100 is going through once a new input-output command is received from the host after the storage system is exiting sleep. Each of these stages of waking up from sleep consumes time and, hence, expanding the time it takes for the storage system 100 to complete the initial requested operation from the host. Visualizing these stages and hidden states will help engineers learn and test their solutions for difficult and hidden points involved with waking up from sleep and find ways to optimize the sleep features and algorithms.

Figure 7:
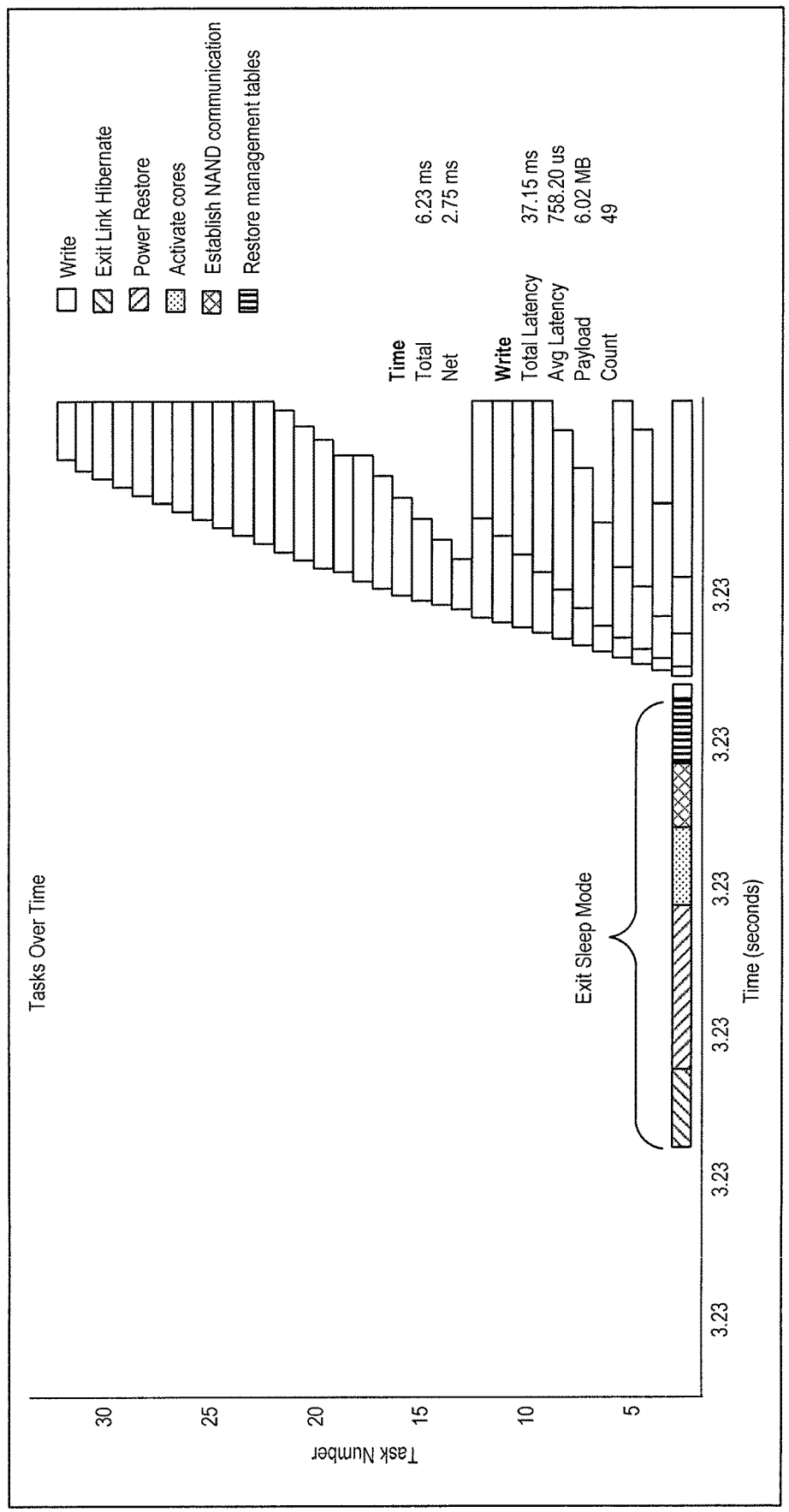
FIG. 7 is a graph of an embodiment that visualizes sleep mode inner state processing.

FIG. 7 is an example graph of an embodiment that visualizes sleep mode inner state processing. As shown in FIG. 7, this graph shows the various stages (exiting link hibernation, power restore, activate cores, and establish memory communication) that the storage system 100 goes through when exiting sleep mode, the number of tasks involved, and when and how long those stages occurred. The graph also shows information on tasks that occurred to perform write operations after the storage system 100 exited sleep mode. This graph can be useful for an engineer to know what to test and improve to allow the storage system 100 to exit sleep mode more quickly. For example, if the graph shows that activating the cores is taking a very long time, this could indicate a problem with the controller 102 that needs to be addressed. It should be noted that while FIG. 7 shows a graph, the information can be visualized in any suitable way (e.g., via a chart, table, or other displayed presentation).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for visualizing sleep mode inner state processing, the method comprising:
    performing the following in a computing device in communication with a storage system comprising a memory:
        determining latency stages for the storage system to exit a sleep mode;
        determining a duration and a number of tasks for each of the latency stages;
        determining a duration and a number of tasks for write operations performed by the storage system after exiting the sleep mode; and
        displaying a graph of the duration and the number of tasks for each of the latency stages and write operations.

2. The method of claim 1, wherein the duration and the number of tasks for each of the latency stages and write operations are determined from information received from the storage system.

3. The method of claim 1, wherein the tasks relate to one or more of the following: exiting link hibernation, restoring power, activating a core, establishing communication with the memory, and restoring a management table.

4. The method of claim 2, wherein the information received from the storage system comprises a trace file.

5. The method of claim 1, wherein the memory comprises a three-dimensional memory.

6. The method of claim 1, wherein the storage system is configured to be embedded in a host.

7. The method of claim 1, wherein the storage system is configured to be removably connected to a host.

8. A computing device comprising:
    an interface configured to communicate with a storage system comprising a memory; and
    a processor configured to:
        determine latency stages for the storage system to exit a sleep mode;
        determine a duration and a number of tasks for each of the latency stages;
        determine a duration and a number of tasks for write operations performed by the storage system after exiting the sleep mode; and
        display a graph of the duration and the number of tasks for each of the latency stages and write operations.

9. The computing device of claim 8, wherein the tasks relate to one or more of the following: exiting link hibernation, restoring power, activating a core, establishing communication with the memory, and restoring a management table.

10. The computing device of claim 8, wherein the duration and the number of tasks for each of the latency stages and write operations are determined from information received from the storage system.

11. The computing device of claim 8, wherein the memory comprises a three-dimensional memory.

12. The computing device of claim 8, wherein the storage system is configured to be embedded in a host.

13. The computing device of claim 8, wherein the storage system is configured to be removably connected to a host.

14. A computing device comprising:
    an interface configured to communicate with a storage system comprising a memory;
    means for determining latency stages for the storage system to exit a sleep mode;
    means for determining a duration and a number of tasks for each of the latency stages;
    means for determining a duration and a number of tasks for write operations performed by the storage system after exiting the sleep mode; and
    means for displaying a graph of the duration and the number of tasks for each of the latency stages and write operations.

15. The method of claim 1, further comprising correlating the duration and the number of tasks for each of the latency stages with a thermal event experienced by the storage system.

16. The method of claim 1, further comprising correlating the duration and the number of tasks for each of the latency stages with input-output activity of the storage system.

17. The method of claim 1, further comprising correlating the duration and the number of tasks for each of the latency stages with a state of a link layer of a bus that passes commands between the storage system and a host.

18. The computing device of claim 8, wherein the processor is further configured to correlate the duration and the number of tasks for each of the latency stages with a thermal event experienced by the storage system.

19. The computing device of claim 8, wherein the processor is further configured to correlate the duration and the number of tasks for each of the latency stages with input-output activity of the storage system.

20. The computing device of claim 8, wherein the processor is further configured to correlate the duration and the number of tasks for each of the latency stages with a state of a link layer of a bus that passes commands between the storage system and a host.

* * * * *